(12) United States Patent
Bonney et al.

(10) Patent No.: US 8,066,260 B1
(45) Date of Patent: Nov. 29, 2011

(54) CABLE PULLING SYSTEM

(76) Inventors: Eugene H. Bonney, Belfast, ME (US);
Joseph Bonney, Belfast, ME (US)

( * ) Notice: Subject to any disclaimer, the term of this patent is extended or adjusted under 35 U.S.C. 154(b) by 0 days.

(21) Appl. No.: 12/930,586

(22) Filed: Jan. 11, 2011

(51) Int. Cl.
 *E21C 29/16* (2006.01)
(52) U.S. Cl. .......................... 254/134.3 R; 254/134.3 FT
(58) Field of Classification Search ........... 254/134.3 R, 254/134.3 FT
See application file for complete search history.

(56) References Cited

U.S. PATENT DOCUMENTS

| | | | |
|---|---|---|---|
| 3,291,449 A * | 12/1966 | Hughes | 254/134.3 FT |
| 3,968,952 A * | 7/1976 | Newell | 254/134.3 R |
| 4,456,225 A * | 6/1984 | Lucas | 254/134.3 FT |
| 4,497,470 A * | 2/1985 | Carter et al. | 254/134.3 FT |
| 4,771,988 A * | 9/1988 | Scroggins, Sr. | 254/336 |
| 4,801,127 A * | 1/1989 | Patterson, Jr. | 254/134.3 FT |
| 5,516,080 A | 5/1996 | McVaugh | |
| 2003/0098450 A1 * | 5/2003 | Cook et al. | 254/134.3 R |
| 2009/0078921 A1 * | 3/2009 | Plummer | 254/134.3 FT |

* cited by examiner

*Primary Examiner* — Lee D Wilson
(74) *Attorney, Agent, or Firm* — Edward P. Dutkiewicz

(57) ABSTRACT

A cable pulling system comprising a lower pulley assembly, an intermediate pulley assembly, and an upper pulley assembly. The system allows for a cable to be pulled through a range of angle and elevation without damage to the cable.

5 Claims, 3 Drawing Sheets

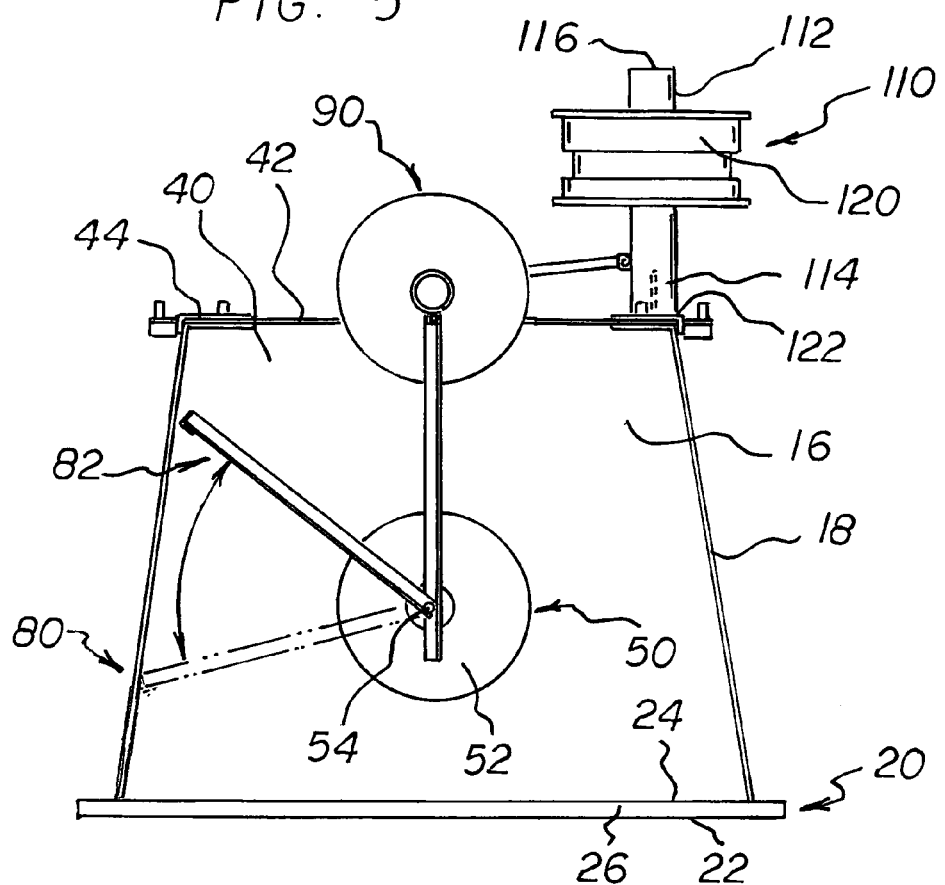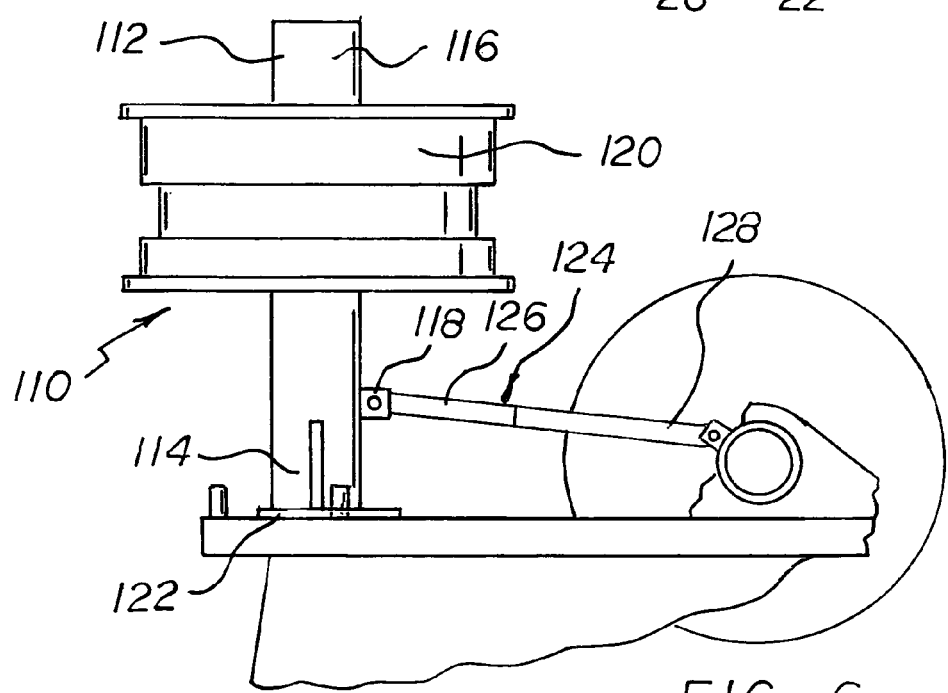

CABLE PULLING SYSTEM

RULE 1.78(F)(1) DISCLOSURE

The Applicants have not submitted a related pending or patented non-provisional application within two months of the filing date of this present application. The invention is made by two inventors, and there are no other inventors to be disclosed. This application is not under assignment to any other person or entity at this time.

BACKGROUND OF THE INVENTION

1. Field of the Invention

The present invention relates to a CABLE PULLING SYSTEM and more particularly pertains to a device for pulling cable.

2. Description of the Prior Art

The use of devices for pulling line or cable is known in the prior art. More specifically, devices for pulling line or cable previously devised and utilized for the purpose of placement or replacement of cable around obstacles are known to consist basically of familiar, expected, and obvious structural configurations, which has been developed for the fulfillment of the objectives and requirements.

While the prior art devices fulfill their respective, particular objectives and requirements, the prior art does not describe a cable pulling system that allows a device for pulling cable through a range of angles and elevations, as is herein described.

In this respect, the cable pulling system according to the present invention substantially departs from the conventional concepts and designs of the prior art, and in doing so provides an apparatus primarily developed for the purpose of pulling cable.

Therefore, it can be appreciated that there exists a continuing need for a new and improved cable pulling system which can be used for a device for pulling cable. In this regard, the present invention substantially fulfills this need.

SUMMARY OF THE INVENTION

In view of the foregoing disadvantages inherent in the known types of devices for pulling line or cable now present in the prior art, the present invention provides an improved cable pulling system. As such, the general purpose of the present invention, which will be described subsequently in greater detail, is to provide a new and improved cable pulling system which has all the advantages of the prior art and none of the disadvantages.

To attain this, the present invention essentially comprises a cable pulling system comprising several components, in combination.

Utility cables usually have an associated cable housing. The housing has a wall portion and a base portion. The housing also has an upper edge. Generally, the upper edge has a plurality of holes therein, for mounting various structures to the housing. The housing has a generally trapezoidal configuration. The housing has an external surface and an internal surface. The internal and external surfaces form a wall thickness there between. The housing has a bottom pad. The bottom pad of the housing and the housing is fabricated of a rigid material. The pad has an upper surface and a lower surface, with a thickness there between. The housing trapezoidal configuration has a plurality of sides. Each side of the housing has a cable aperture there through. One side has a lock tab located on the internal surface.

The top of the housing is open and has a top edge. The top edge has a plurality of bolt holes there through The present invention is made to mate with the top edge of the utility housing First provided is a plurality of support members oriented along the top edge of the housing.

Next is provided a lower pulley assembly. The lower pulley assembly comprises a lower pulley and a pulley axle. The lower pulley axle has a generally horizontal orientation, with the axle having a first end and a second end and a length there between. The lower pulley rotates in a first, vertical, plane The lower pulley assembly also has a pulley assembly brace and a pulley holder. The pulley holder has a pair of struts. Each strut has an upper end and a lower end. The lower end of each strut is operatively coupled to the pulley axle.

The lower pulley brace has a pair of generally parallel legs and a cross member. Each leg has an axle end and a cross member end. The axle end of each brace leg is rotatably coupled to the lower axle. Each cross member end of each brace leg is coupled to the cross member.

In operation, the pulley brace is coupled to the housing. The lower pulley assembly is oriented so as to have the lower pulley oriented and rotatable in a first generally vertical plane.

Next provided is an intermediate pulley assembly. The intermediate pulley assembly has a generally horizontal axle with a first end and a second end, having a length there between and an axle strut mount.

The intermediate pulley assembly also has an intermediate pulley and a pair of axle blocks. The axle blocks are located on the first end and the second end of the horizontal axle and operatively couple the horizontal axle to the support members which are operatively coupled to the top edge of the housing, thereby fixing the intermediate pulley assembly axle in a generally horizontal orientation with the pulley rotating in a generally vertical plane.

The intermediate pulley assembly is oriented so as to have the intermediate pulley oriented and rotatable in the first generally vertical plane. The intermediate pulley assembly axle is operatively coupled to the upper ends of each of the lower pulley assembly struts.

Next provided is an upper pulley assembly. The upper pulley assembly has a generally vertical axle with a first end and a second end, having a length there between, with an axle strut mount.

The upper pulley assembly also has an upper pulley and a single axle mount. The first end of the vertical axle mount is located on the support members of the housing edge. The second end of the vertical axle is free, thereby fixing the upper pulley assembly axle in a generally vertical orientation. The upper pulley assembly is oriented so as to have the upper pulley oriented and rotatable in a second plane. The second plane has a generally horizontal orientation.

Lastly provided is an intermediate axle and upper axle connecting adjustable strut. The strut has a generally tubular configuration having a first end being operatively coupled to the vertical axle and a second end being operatively coupled to the horizontal intermediate axle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cable pulling system which has all of the advantages of the prior art devices for pulling line or cable and none of the disadvantages.

It is another object of the present invention to provide a new and improved cable pulling system which may be easily and efficiently manufactured and marketed.

It is further object of the present invention to provide a new and improved cable pulling system which is of durable and reliable constructions.

An even further object of the present invention is to provide a new and improved cable pulling system which is susceptible of a low cost of manufacture with regard to both materials and labor, and which accordingly is then susceptible of low prices of sale to the consuming public, thereby making such cable pulling system economically available to the buying public.

Even still another object of the present invention is to provide a cable pulling system for a device for pulling cable through a range of angles and elevations.

Lastly, it is an object of the present invention to provide a new and improved cable pulling system comprising a plurality of support members, with the support members being coupled to the housing of the pad. Also provided is a lower pulley assembly, an intermediate pulley assembly, and an upper pulley assembly. The system allows for a cable to be pulled through a range of angle and elevation without damage to the cable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a view taken along line 5-5 of FIG. 4. Note the deployed and non-deployed lower pulley brace.

FIG. 6 is a close-up view of the upper pulley assembly.

The same reference numerals refer to the same parts throughout the various Figures.

DESCRIPTION OF THE PREFERRED EMBODIMENT

Figure 1:
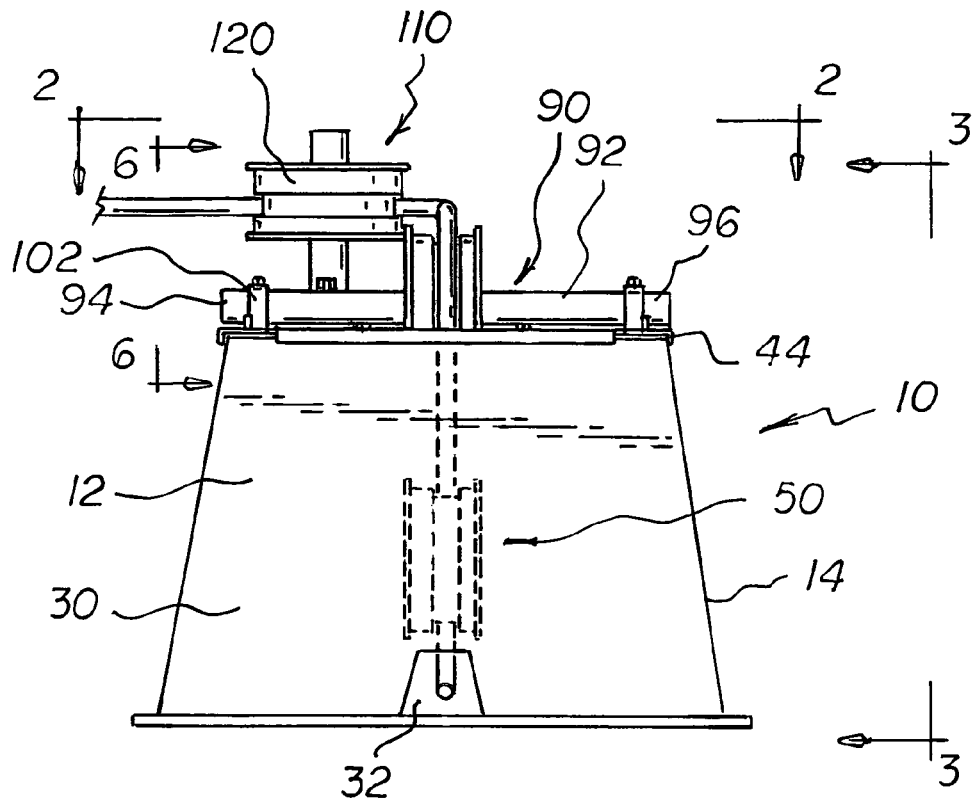
FIG. 1 is a side elevational view of the cable pulling system. The lower pulley assembly is shown in phantom.

With reference now to the drawings, and in particular to FIG. 1 thereof, the preferred embodiment of the new and improved cable pulling system embodying the principles and concepts of the present invention and generally designated by the reference numeral 10 will be described.

The present invention, the cable pulling system is comprised of a plurality of components. Such components in their broadest context include a plurality of pad mounting plates, called support members, a lower pulley, an intermediate pulley, and an upper pulley. Such components are individually configured and correlated with respect to each other so as to attain the desired objective.

Generally, the utility company provides a pad, which is herein described. The pad has a flat lower surface and a trapezoidal shaped housing 12. The housing has an external surface 14 and an internal surface 16. The internal and external surfaces form a wall thickness 18 there between. The housing has a bottom 20. The bottom has an external surface 22 and an internal surface 24, thereby forming a bottom wall thickness 26 there between. The housing trapezoidal configuration has a plurality of sides 30. Each side of the housing has a cable aperture 32 there through. The pad, as is herein referred to, is considered to be existing, as part of the utility company equipment. The present device uses the existing pad to attach the cable pulling device to, so as to effectuate cable pulling in a safe, damage free, manner.

It is anticipated that if a pad and housing is not available, a like structure may be used to effectuate the use of the herein described cable pulling system.

The top of the pad housing is open 40 and has a top edge 42. The present invention is a device which is remove-ably coupled to the top edge of the housing. During operation it is fixed to the top of the housing, but when cable pulling is completed, the device is removed from the top edge of the housing.

Having been so described, it can be seen that the pad may be envisioned with the cable pulling device attached thereto, though the pad is not considered to be an element of the invention.

A cable pulling system 10 comprising several components, in combination is herein described.

Figure 2:
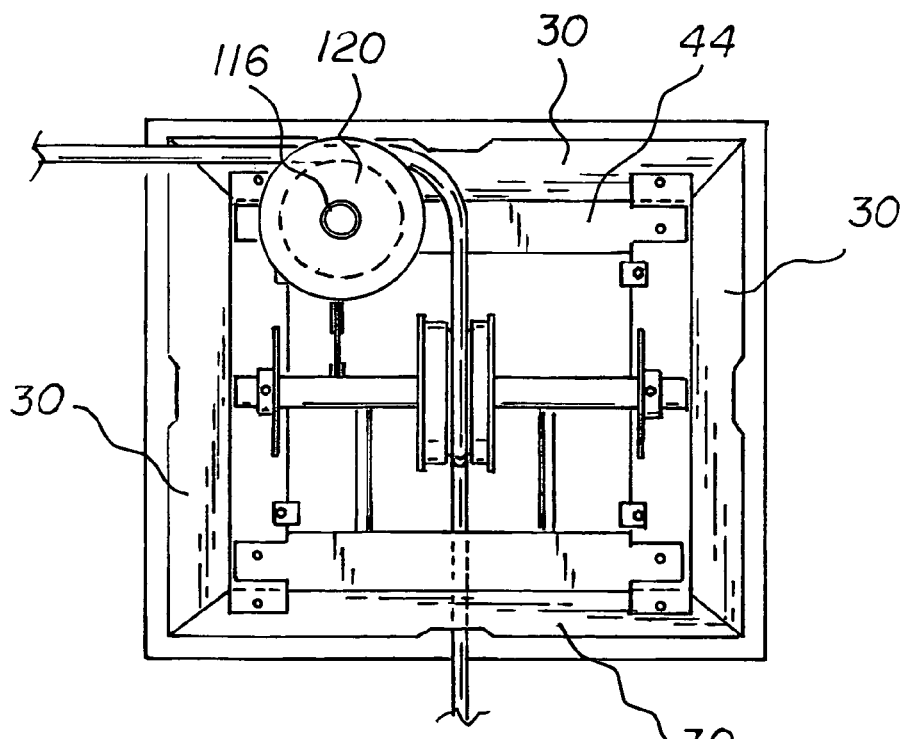
FIG. 2 is a top plan view of the cable pulling system, taken along line 2-2 of FIG. 1. Note that the cable is making a ninety degree turn as it leaves the intermediate pulley and goes around the upper pulley.

First provided is a plurality of support members 44 oriented along the top edge of the pad housing. The support members are coupled together, to form a generally rectilinear configuration, or frame as shown in FIG. 2. The support members are bolted to the top of the housing, though, in other variations other fastening means, such as clips, clamps, pins, rivets, or wire, may be used to fasten the support members to the top of the pad housing.

In variations of the preferred embodiment, the support members may comprise a single support member. In the preferred embodiment, there are a plurality of support members. This allows the support members to be configured so as to applicable in more than one configuration, to provide a wider range of applicability.

In other configurations, the housing may be of any shape, or may be skeletonized. The term "housing" is intended to include those variations in form which are different from the generally trapezoidal configuration.

In other configurations, there may be more than one aperture through the housing, which would allow for a variety of points of entry of the cable into the cable pulling system.

Next is provided a lower pulley assembly 50. The lower pulley assembly comprises a lower pulley 52 and a pulley axle 54. The lower pulley axle has a generally horizontal orientation, with the axle having a first end 56 and a second end 58 and a length there between.

The lower pulley assembly also has a pulley assembly brace 60 and a pulley holder 62. The pulley holder has a pair of struts 64. Each strut has an upper end 66 and a lower end 68. The lower end of each strut is operatively coupled to the pulley axle. The lower pulley brace has a pair of generally parallel legs 70 and a cross member 72. Each leg has an axle end 74 and a cross member end 76. The axle end of each brace leg is rotatably coupled to the lower axle. Each cross member end of each brace leg is coupled to the cross member.

The pulley brace is rotatable about the intermediate axle in any orientation, one of which is a first orientation 80 and another being a second orientation 82 in which the pulley brace engages the pad housing. The lower pulley assembly is oriented so as to have the lower pulley oriented and rotatable in a first generally vertical plane.

In operation the lower pulley assembly is intended to be movable about the intermediate axle. The pulley brace is configured to provide support, by contacting the transformer pad or pad housing wall, thereby preventing any movement caused by pulling on a cable which is threaded through the cable puller. The brace minimizes the amount of torque experienced by the struts at a point of connection at the upper end of each of the struts.

In other configurations, the brace may have a generally arcuate, or pointed configuration.

Next provided is an intermediate pulley assembly 90. The intermediate pulley assembly has a generally horizontal axle 92 with a first end 94 and a second end 96, having a length there between and an axle strut mount 98.

The intermediate pulley assembly also has an intermediate pulley 100 and a pair of axle braces 102. The axle braces are located on the first end and the second end of the horizontal axle and operatively couple the horizontal axle to the top edge support members, which, during operation, are coupled to the top of the pad housing, thereby fixing the intermediate pulley assembly axle in a generally horizontal orientation.

The intermediate pulley assembly is oriented so as to have the intermediate pulley oriented and rotatable in the first generally vertical plane. The intermediate pulley assembly axle is operatively coupled to the upper ends of each of the lower pulley assembly struts.

Next provided is an upper pulley assembly 110. The upper pulley assembly has a generally vertical axle 112 with a first end 114 and a second end 116, having a length there between, with an axle strut mount 118.

The upper pulley assembly also has an upper pulley 120 and a single axle mount 122. The first end of the vertical axle mount is located on the support members. The second end of the vertical axle is free, thereby fixing the upper pulley assembly axle in a generally vertical orientation. The upper pulley assembly is oriented so as to have the upper pulley oriented and rotatable in a second plane. The second plane has a generally horizontal orientation.

In the preferred embodiment, the first plane, being generally vertical, and the second plane, being generally horizontal, are oriented about 90 degrees to each other. In other variations, the first plane and the second plane may be oriented, relative to each other, within a range of between about 80 degrees and 100 degrees.

Lastly provided is an intermediate axle and upper axle connecting strut 124. The strut is adjustable, having a first end 126 being operatively coupled to the vertical axle and a second end 128 being operatively coupled to the horizontal intermediate axle.

Figure 3:
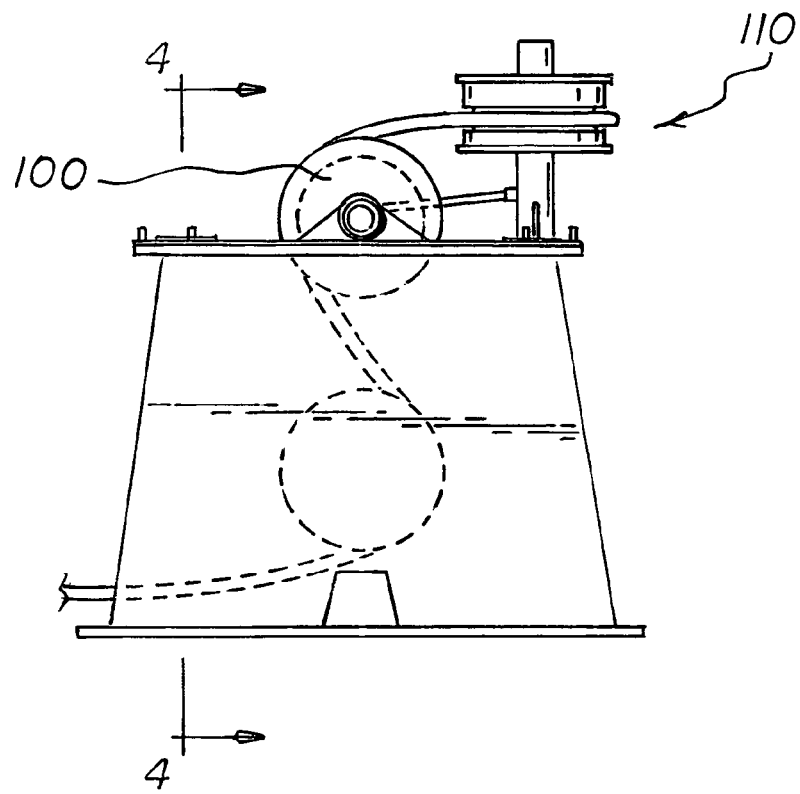
FIG. 3 is a view taken along line 3-3 of FIG. 1.
Figure 4:
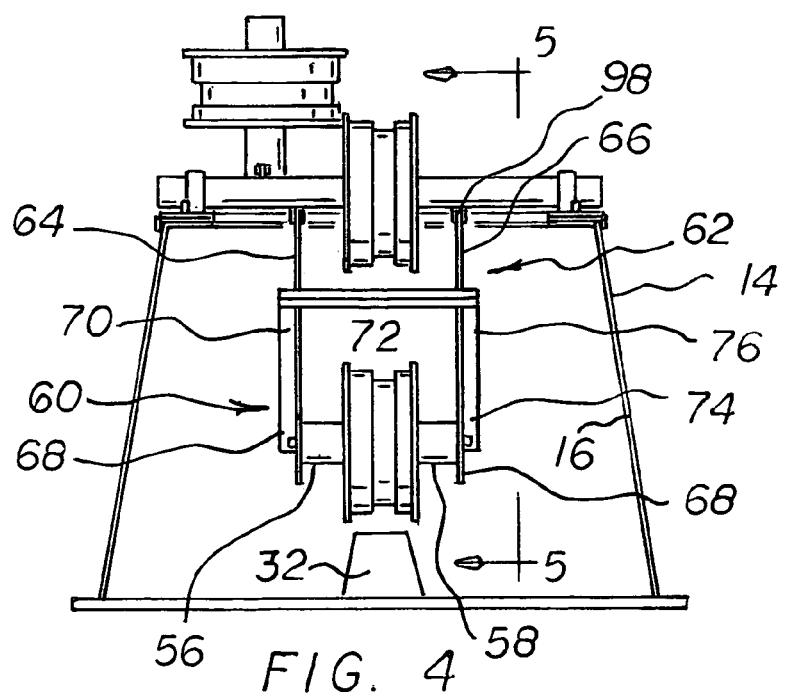
FIG. 4 is a view taken along line 44 of FIG. 3.

Operatively, the cable being pulled is advanced through the cable aperture, around the lower pulley, which is then braced against the transformer pad, or transformer housing wall. The cable is advanced in a serpentine manner, around the intermediate pulley, as shown in FIG. 3. The cable moves within the first generally vertical plane from the lower pulley, to, and around, the intermediate pulley. The cable then is threaded around the upper pulley, which changes the plane of movement from the first vertical plane, to the second, horizontal plane.

The configuration is intended to be used in moving a cable from a first direction to moving the cable to a second direction, as dictated by the terrain. This device allows the cable to be pulled continuously, in any desired direction without having to pull the entire desired length of cable in a first direction, and then pulling the cable in a second direction. Pulling may be done with any vehicle, winlass, or traction device available.

The configuration, with the lower, intermediate, and upper pulleys allow the device to be used in a ditch, or hole, pulling the cable through the ditch, or through subterranean conduit. The primary advantage is that damage to the cable is minimized, or all together eliminated.

The inter-pulley distance, between the lower pulley and the intermediate pulley, determines the changes in depth the cable makes when it is pulled through the device. This inter-pulley distance may be varied in length, and may be modified to suite the job requirements. The upper pulley is oriented so as to directly feed from the intermediate pulley, and the upper and intermediate pulley orientation is not changeable, in that an increase or decrease in distance or orientation would cause the cable to slip from the upper pulley, as it would be pulled at an angle to the pulley.

The configuration of the device allows for the cable to be pulled in a wide range of angle, relative to the incoming cable. The upper pulley allows for the cable to be pulled from an angle of 0 degrees, relative to the direction of pull from the intermediate pulley, to an angle of about 190 degrees. The upper pulley functions as a roller. The cable may be pulled at 0 degrees, or in a straight line relative to the incoming cable. In the preferred embodiment the cable changes angle, relative to the incoming cable. Any change in elevation of the cable is independent in any change in angle, and is determined by the relative elevation of the lower pulley.

In variations of the embodiment, the length of the lower pulley holder struts may alter the elevational change of the cable, with a shorter lower pulley holder strut being used to lessen the elevational change of the cable, from input to output within the cable pulling system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cable pulling system comprising, in combination:
a plurality of support members;
a lower pulley assembly comprising a lower pulley and a pulley axle with the lower pulley assembly being operatively coupled to the support member, the lower pulley assembly having a lower pulley assembly brace and a lower pulley holder, the lower pulley assembly pulley holder comprising a pair of struts, with each strut having an upper end and a lower end, with the lower end being operatively coupled to the pulley axle, the lower pulley assembly lower pulley brace having a pair of generally parallel legs and a cross member, with each leg having an axle end and a cross member end, with the axle end of each brace leg being rotatably coupled to the axle and each cross member end of each brace leg being coupled to the cross member;
an intermediate pulley assembly having an intermediate pulley and an axle, the intermediate pulley assembly being operatively coupled to the support member, the axle of the intermediate pulley assembly having a first end and a second end having a length there between the intermediate pulley assembly having a pair of axle blocks to couple the intermediate axle to the support member, the intermediate pulley assembly having an axle strut mount; and
an upper pulley assembly having an upper pulley and an axle, the upper pulley assembly being operatively coupled to the support member, the upper pulley assembly axle having a first end and a second end and a length there between, the upper pulley assembly having a single axle mount, the first end of the upper pulley assembly axle mount being located on the support members, the second end of the vertical axle being free.

2. The cable pulling system as described in claim 1, with the system further comprising:
the pulley brace being rotatable between a braced orientation and a free orientation wherein the cross member end of the pulley brace is free, the lower pulley assembly being oriented so as to have the lower pulley oriented and rotatable in a first generally vertical plane;
the intermediate pulley assembly axle blocks being located on the first end and second end of the axle and operatively coupling the axle to the support members; and
the upper pulley assembly being oriented so as to have the upper pulley oriented and rotatable in a second plane, being a horizontal plane.

3. The cable pulling system as described in claim 2, with the system further comprising:
the intermediate pulley assembly axle being operatively coupled to the upper ends of each of the lower pulley assembly struts;
the upper pulley assembly having an axle strut mount;
an intermediate axle and upper axle connecting strut, the strut being operatively coupled to the upper pulley assembly and the intermediate pulley assembly.

4. The cable pulling system as described in claim 3, with the system further comprising:
the lower pulley assembly axle having a first end and a second end and a length there between; and
the intermediate axle and upper axle connecting strut having a first end being coupled to the vertical axle.

5. The cable pulling system as described in claim 4, with the system further comprising:
the lower pulley assembly having a generally horizontal orientation;
the intermediate pulley assembly having a generally horizontal axle;
the intermediate pulley assembly pulley blocks fixing the intermediate pulley assembly axle in a generally horizontal orientation, with the intermediate pulley assembly being oriented so as to have the intermediate pulley oriented and rotatable in the first generally vertical plane;
the upper pulley assembly axle being oriented in a generally vertical position; and
the intermediate axle and upper axle connecting strut second end being operatively coupled to the horizontal intermediate axle.

\* \* \* \* \*